US011146760B2

(12) United States Patent
Yoshizaki

(10) Patent No.: US 11,146,760 B2
(45) Date of Patent: Oct. 12, 2021

(54) IMAGING APPARATUS, IMAGING METHOD, AND COMPUTER READABLE RECORDING MEDIUM

(71) Applicant: OLYMPUS CORPORATION, Tokyo (JP)

(72) Inventor: Kazunori Yoshizaki, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 99 days.

(21) Appl. No.: 16/714,898

(22) Filed: Dec. 16, 2019

(65) Prior Publication Data
US 2020/0120314 A1    Apr. 16, 2020

Related U.S. Application Data

(63) Continuation of application No. PCT/JP2017/023018, filed on Jun. 22, 2017.

(51) Int. Cl.
*H04N 9/04*    (2006.01)
*H04N 5/00*    (2011.01)
(Continued)

(52) U.S. Cl.
CPC ......... *H04N 9/0451* (2018.08); *H04N 5/2351* (2013.01); *H04N 5/2353* (2013.01);
(Continued)

(58) Field of Classification Search
CPC ... H04N 9/0451; H04N 9/04551; H04N 5/332
(Continued)

(56) References Cited

U.S. PATENT DOCUMENTS

2010/0069758 A1*  3/2010  Barnes ............... A61B 5/015
                                                600/473
2017/0163914 A1*  6/2017  Hara ..................... H04N 5/378

FOREIGN PATENT DOCUMENTS

JP    H09-305820 A    11/1997
JP    2007-202108 A    8/2007
(Continued)

OTHER PUBLICATIONS

International Search Report dated Sep. 12, 2017 issued in PCT/JP2017/023018.

*Primary Examiner* — Jeffery A Williams
(74) *Attorney, Agent, or Firm* — Scully, Scott, Murphy & Presser, P.C.

(57) ABSTRACT

An imaging apparatus includes: an imaging sensor including a plurality of pixels; a color filter including a plurality of filters arranged to correspond to the pixels; a first light source configured to irradiate a subject with visible light; a second light source configured to irradiate the subject with near-infrared light; a first processor including hardware, the first processor being configured to control an irradiation timing of each of the first light source and the second light source; and a second processor including hardware, the second processor being configured to generate a plurality of pieces of near-infrared image data on different near-infrared regions based on first image data and second image data, the first image data being generated by the imaging sensor by capturing an image of the subject, the second image data being generated by the imaging sensor by capturing an image of the subject.

12 Claims, 10 Drawing Sheets

(51) Int. Cl.
 *H04N 5/235* (2006.01)
 *H04N 9/097* (2006.01)
(52) U.S. Cl.
 CPC ....... *H04N 5/2354* (2013.01); *H04N 9/04551* (2018.08); *H04N 9/097* (2013.01)
(58) Field of Classification Search
 USPC ........................................................ 348/164
 See application file for complete search history.

(56) References Cited

FOREIGN PATENT DOCUMENTS

| | | | |
|---|---|---|---|
| JP | 2008-099039 A | | 4/2008 |
| JP | 2010212306 A | * | 9/2010 |
| WO | WO 2017/069134 A1 | | 4/2017 |

* cited by examiner

IMAGING APPARATUS, IMAGING METHOD, AND COMPUTER READABLE RECORDING MEDIUM

CROSS-REFERENCE TO RELATED APPLICATION

This application is a continuation of International Application No. PCT/JP2017/023018, filed on Jun. 22, 2017, the entire contents of which are incorporated herein by reference.

BACKGROUND

1. Technical Field

The present disclosure relates to an imaging apparatus, an imaging method, and a computer readable recording medium that capture a visible light image and a near-infrared image.

2. Related Art

In the related art, a technology for capturing a color image and a monochrome image by an imaging apparatus, such as a digital camera, has been known (see Japanese Laid-open Patent Publication No. 2007-202108). In this technology, a first pixel that receives both of visible light and infrared light and a second pixel that receives infrared light are arranged in an imaging element, and a color image with high color reproducibility and a monochrome image with high sensitivity are obtained by subtracting a signal that is obtained by multiplying a signal output from the second pixel by a coefficient from a signal that is output from the first pixel.

SUMMARY

In some embodiments, an imaging apparatus includes: an imaging sensor including a plurality of pixels that are arranged in a two-dimensional grid pattern, the pixels being configured to generate image data by receiving light and performing photoelectric conversion; a color filter including a plurality of filters configured to transmit visible light in different wavelength bands in a visible region and near-infrared light in different wavelength bands in a near-infrared region, the plurality of filters being arranged to correspond to the pixels; a first light source configured to irradiate a subject with the visible light; a second light source configured to irradiate the subject with the near-infrared light; a first processor comprising hardware, the first processor being configured to control an irradiation timing of each of the first light source and the second light source; and a second processor comprising hardware, the second processor being configured to generate a plurality of pieces of near-infrared image data on different near-infrared regions based on first image data and second image data, the first image data being generated by the imaging sensor by capturing an image of the subject when the first processor causes the first light source to emit the visible light, the second image data being generated by the imaging sensor by capturing an image of the subject when the first processor causes the first light source to emit the visible light and causes the second light source to emit the near-infrared light simultaneously.

In some embodiments, provided is an imaging method implemented by an imaging apparatus including: an imaging sensor including a plurality of pixels that are arranged in a two-dimensional grid pattern, the pixels being configured to generate image data by receiving light and performing photoelectric conversion; a color filter including a plurality of filters configured to transmit visible light in different wavelength bands in a visible region and near-infrared light in different wavelength bands in a near-infrared region, the plurality of filters being arranged to correspond to the pixels; a first light source configured to irradiate a subject with the visible light; and a second light source configured to irradiate the subject with the near-infrared light. The imaging method includes: causing the first light source to emit the visible light; causing the imaging sensor to capture an image of the subject irradiated with the visible light and generate first image data; causing the first light source and the second light source to emit light simultaneously; causing the imaging sensor to capture an image of the subject irradiated with the visible light and the near-infrared light and generate second image data; and generating a plurality of pieces of near-infrared image data on different near-infrared regions based on the first image data and the second image data.

In some embodiments, provided is a non-transitory computer-readable recording medium with an executable program stored thereon. The program causes an imaging apparatus that includes: an imaging sensor including a plurality of pixels that are arranged in a two-dimensional grid pattern, the pixels being configured to generate image data by receiving light and performing photoelectric conversion; a color filter including a plurality of filters configured to transmit visible light in different wavelength bands in a visible region and near-infrared light in different wavelength bands in a near-infrared region, the plurality of filters being arranged to correspond to the pixels; a first light source configured to irradiate a subject with the visible light; and a second light source configured to irradiate the subject with the near-infrared light, to execute: causing the first light source to emit the visible light; causing the imaging sensor to capture an image of the subject irradiated with the visible light and generate first image data; causing the first light source and the second light source to emit light simultaneously; causing the imaging sensor to capture an image of the subject irradiated with the visible light and the near-infrared light and generate second image data; and generating a plurality of pieces of near-infrared image data on different near-infrared regions based on the first image data and the second image data.

The above and other features, advantages and technical and industrial significance of this disclosure will be better understood by reading the following detailed description of presently preferred embodiments of the disclosure, when considered in connection with the accompanying drawings.

DETAILED DESCRIPTION

Modes (hereinafter, referred to as "embodiments") for carrying out the present disclosure will be described below. In the embodiments, an imaging apparatus that captures an image of a subject by irradiating the subject with light and generates image data will be described. Further, the present disclosure is not limited by the embodiments below. Furthermore, in description of the drawings, the same components are denoted by the same reference symbols.

First Embodiment

Configuration of Imaging Apparatus

Figure 1:
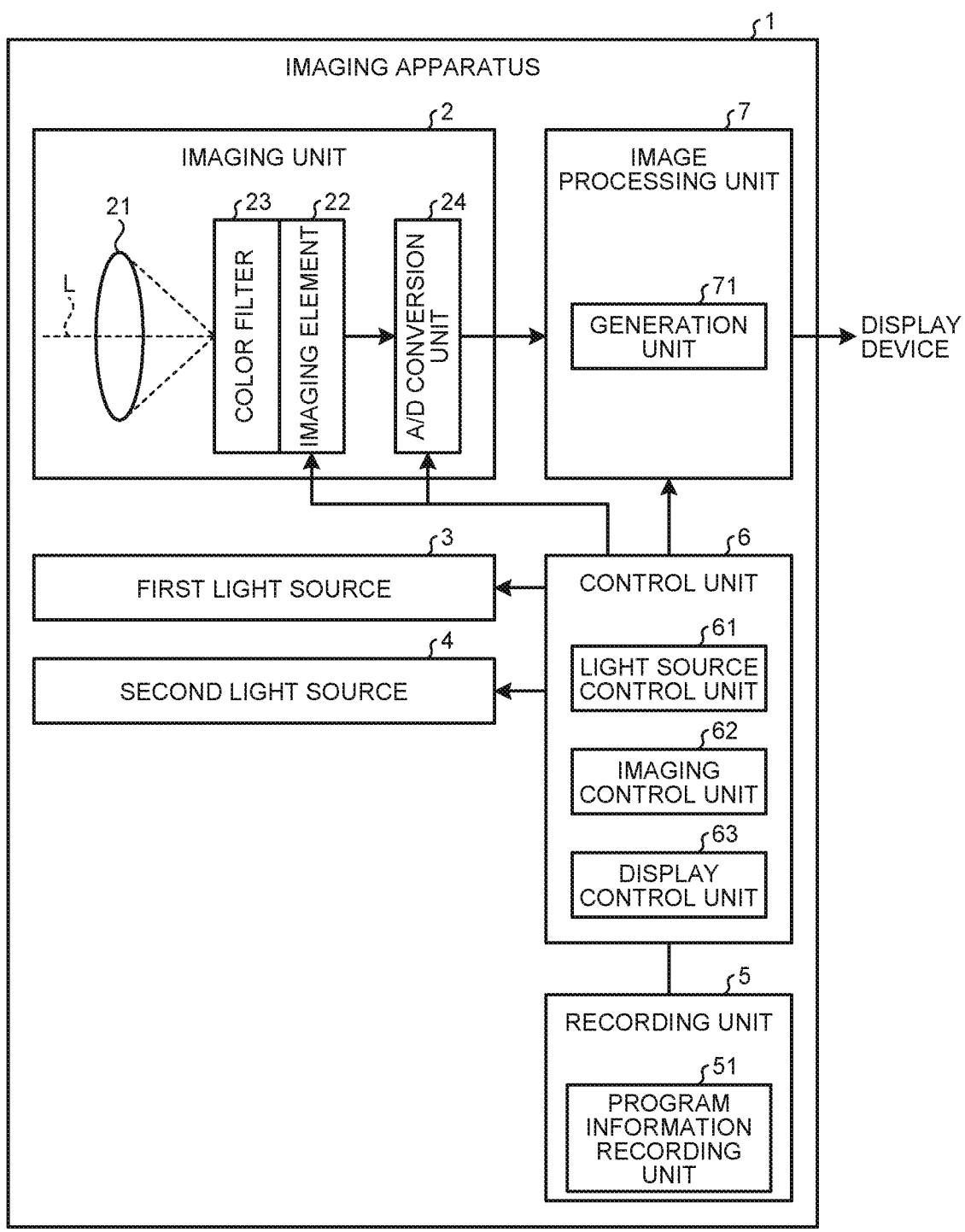
FIG. 1 is a block diagram illustrating a functional configuration of an imaging apparatus according to a first embodiment.

FIG. 1 is a block diagram illustrating a functional configuration of an imaging apparatus according to a first embodiment. An imaging apparatus 1 illustrated in FIG. 1 includes an imaging unit 2 that captures an image of a subject and generates image data, a first light source 3 that emits visible light, a second light source 4 that emits near-infrared light, a recording unit 5 that records therein various kinds of information, a control unit 6 that comprehensively controls each of units of the imaging apparatus 1, and an image processing unit 7 that performs various kinds of image processing on the image data generated by the imaging unit 2 and outputs the image data to an external display device or the like. In the first embodiment, the imaging apparatus 1 may include an input unit that receives input through external operation, a display unit that displays an image corresponding to the image data subjected to the image processing by the image processing unit 7, and the like.

The imaging unit 2 includes an optical system 21, an imaging element 22, a color filter 23, and an analog-to-digital (A/D) conversion unit 24.

The optical system 21 forms a subject image on a light receiving surface of the imaging element 22. The optical system 21 is constituted by one or more lenses and has a zoom function and a focus function. The optical system 21 changes a zoom magnification and a focus position by being moved on an optical axis L by a driving unit, such as a motor (not illustrated).

The imaging element 22 is arranged vertically with respect to the optical axis L of the optical system 21, generates an electrical signal (image signal) by receiving light of the subject image formed by the optical system 21 and performing photoelectric conversion on the light, and outputs the electrical signal to the A/D conversion unit 24 under the control of the control unit 6. The imaging element 22 is realized by an image sensor, such as a charge coupled device (CCD) or a complementary metal oxide semiconductor (CMOS).

Figure 2:
FIG. 2 is a diagram schematically illustrating a configuration of an imaging element included in the imaging apparatus according to the first embodiment.

FIG. 2 is a diagram schematically illustrating a configuration of the imaging element 22. As illustrated in FIG. 2, the imaging element 22 includes a plurality of pixels P that are arranged in a two-dimensional grid pattern (two-dimensional matrix pattern) and that receive light from the optical system 21. Each of the pixels P receives light incident from the optical system 21 via the color filter 23, performs photoelectric conversion on the light, and generates an electrical signal. The electrical signal includes a pixel value (luminance value) of each of the pixels, positional information (pixel address) on each of the pixels, and the like. In FIG. 2, a pixel arranged in the i-th row and the j-th column is referred to as a pixel $P_{ij}$.

The color filter 23 is arranged on the light receiving surface of the imaging element 22, and includes a plurality of filters that transmit visible light in different wavelength bands in a visible region and near-infrared light in different wavelength bands in a near-infrared region. The plurality of filters are configured such that a filter unit U1 having Bayer arrangement, in which four filters of 2×2 are arranged in a two-dimensional grid pattern, is arranged in accordance with arrangement of the pixels $P_{ij}$. The pixels $P_{ij}$ for which the filters are arranged receive light that has certain wavelength bands and that has transmitted through the filters. A configuration of the color filter 23 and a transmission characteristic of each of the filters will be described later.

The A/D conversion unit 24 generates digital image data by performing A/D conversion on an analog electrical signal input from the imaging element 22, and outputs the digital image data to the image processing unit 7 under the control of the control unit 6.

The first light source 3 irradiates the subject with visible light (white light) under the control of the control unit 6. Specifically, the first light source 3 irradiates the subject with white light (for example, in a wavelength band of 390 nanometers (nm) to 700 nm) including a red wavelength band, a green wavelength band, and a blue wavelength band. The first light source 3 is realized by a white light emitting diode (LED), a xenon lamp, or the like.

The second light source 4 irradiates the subject with near-infrared light (for example, in a wavelength band of 700 nm to 1000 nm) under the control of the control unit 6. The second light source 4 is realized by an infrared lamp, a near-infrared LED, or the like.

The recording unit 5 records therein various programs to be executed by the imaging apparatus 1, data being processed, and the like. The recording unit 5 is constituted by a flash memory, a synchronous dynamic random access memory (SDRAM), or the like. The recording unit 5 includes a program information recording unit 51 that records therein various programs to be executed by the imaging apparatus 1.

The control unit 6 comprehensively controls each of the units of the imaging apparatus 1. The control unit 6 is constituted by a general-purpose processor, such as a central processing unit (CPU), or a dedicated processor, such as various arithmetic circuits including an application specific integrated circuit (ASIC), a field programmable gate array (FPGA), and the like that implement specific functions. If the control unit 6 is a general-purpose processor, the control unit 6 reads the various programs stored in the recording unit 5, performs operation of giving instructions and transferring data to each of the units included in the imaging apparatus 1, and comprehensively controls entire operation of the imaging apparatus 1. Further, if the control unit 6 is a dedicated processor, the processor may independently perform various kinds of processing, or the processor and the recording unit 5 may perform various kinds of processing in a cooperative manner or a combined manner by using various kinds of data or the like stored in the recording unit 5. The control unit 6 includes a light source control unit 61, an imaging control unit 62, and a display control unit 63.

The light source control unit 61 controls irradiation timings of the first light source 3 and the second light source 4. Specifically, the light source control unit 61 causes the first light source 3 to emit white light based on a frame rate of the imaging element 22. Further, the light source control unit 61 causes the first light source 3 and the second light source 4 to emit light simultaneously.

The imaging control unit 62 controls imaging performed by the imaging unit 2. Specifically, the imaging control unit 62 controls an exposure amount of the imaging element 22, an imaging timing (for example, an exposure time) of the imaging element 22, the frame rate of the imaging element 22, and the like.

The display control unit 63 causes an image corresponding to the image data generated by the image processing unit 7 to be output to an external display device (not illustrated). Specifically, the display control unit 63 assigns image data to each of input channels (RGB channels) of the display device (not illustrated), and causes the image processing unit 7 to output the image data.

The image processing unit 7 performs predetermined image processing on the image data input from the imaging unit 2 and outputs the image data to the display device (not illustrated) under the control of the display control unit 63. The image processing unit 7 is constituted by a graphics processing unit (GPU) or a dedicated processor, such as various arithmetic circuits including an ASIC, an FPGA, and the like that implement specific functions. The image processing unit 7 includes a generation unit 71.

The generation unit 71 generates a plurality of pieces of near-infrared image data on different near-infrared regions, on the basis of first image data (visible light image data) that is generated by the imaging element 22 by receiving visible light when the light source control unit 61 causes the first light source 3 to emit visible light, and on the basis of second image data (visible light+near-infrared image data) that is generated by the imaging element 22 by receiving visible light and near-infrared light when the light source control unit 61 causes the first light source 3 to emit visible light and causes the second light source 4 to emit near-infrared light simultaneously. Further, the generation unit 71 generates a plurality of pieces of near-infrared image data by subtracting a pixel value of each of pixels of a first image corresponding to the first image data from a pixel value of each of pixels of a second image corresponding to the second image data, and thereafter interpolating pixel values from pixel values of neighboring pixels of the same type.

Configuration of Color Filter

Figure 3:
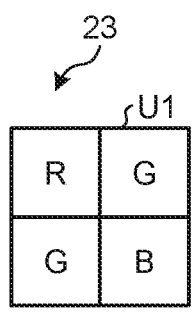
FIG. 3 is a diagram schematically illustrating a configuration of a color filter included in the imaging apparatus according to the first embodiment.

A detailed configuration of the color filter 23 will be described below. FIG. 3 is a diagram schematically illustrating the configuration of the color filter 23.

As illustrated in FIG. 3, the color filter 23 is configured such that the filter unit U1 having Bayer arrangement, in which four filters of 2×2 are arranged in a two-dimensional grid pattern, is arranged in accordance with arrangement of the pixels $P_{ij}$. Specifically, the color filter 23 includes an R filter (first filter), a G filter (second filter), a G filter, and a B filter (third filter) that are arranged in accordance with arrangement of the pixels $P_{ij}$. The pixels $P_{ij}$ for which the filters are arranged receive light that has certain wavelength bands that has transmitted through the filters. Specifically, the pixel $P_{ij}$ for which the R filter that transmits visible light in the red wavelength band serving as a first visible region and near-infrared light in a first near-infrared region is arranged receives the visible light in the red wavelength band serving as the first visible region and the near-infrared light in the first near-infrared region. Hereinafter, the pixel $P_{ij}$ that receives the visible light in the red wavelength band serving as the first visible region and the near-infrared light in the first near-infrared region will be referred to as a first pixel $P_{R1}$. Similarly, the pixel $P_{ij}$ for which the G filter that transmits visible light in the green wavelength band serving as a second visible region and near-infrared light in a second near-infrared region is arranged and which receives the visible light in the green wavelength band serving as the second visible region and the near-infrared light in the second near-infrared region will be referred to as a second pixel $P_{G1}$. Further, the pixel $P_{ij}$ for which the B filter that transmits visible light in the blue wavelength band serving as a third visible region and near-infrared light in a third near-infrared region is arranged and which receives the visible light in the blue wavelength band serving as the third visible region and the near-infrared light in the third near-infrared region will be referred to as a third pixel $P_{B1}$.

Spectral Sensitivity Characteristic of Each of Pixels

Figure 4:
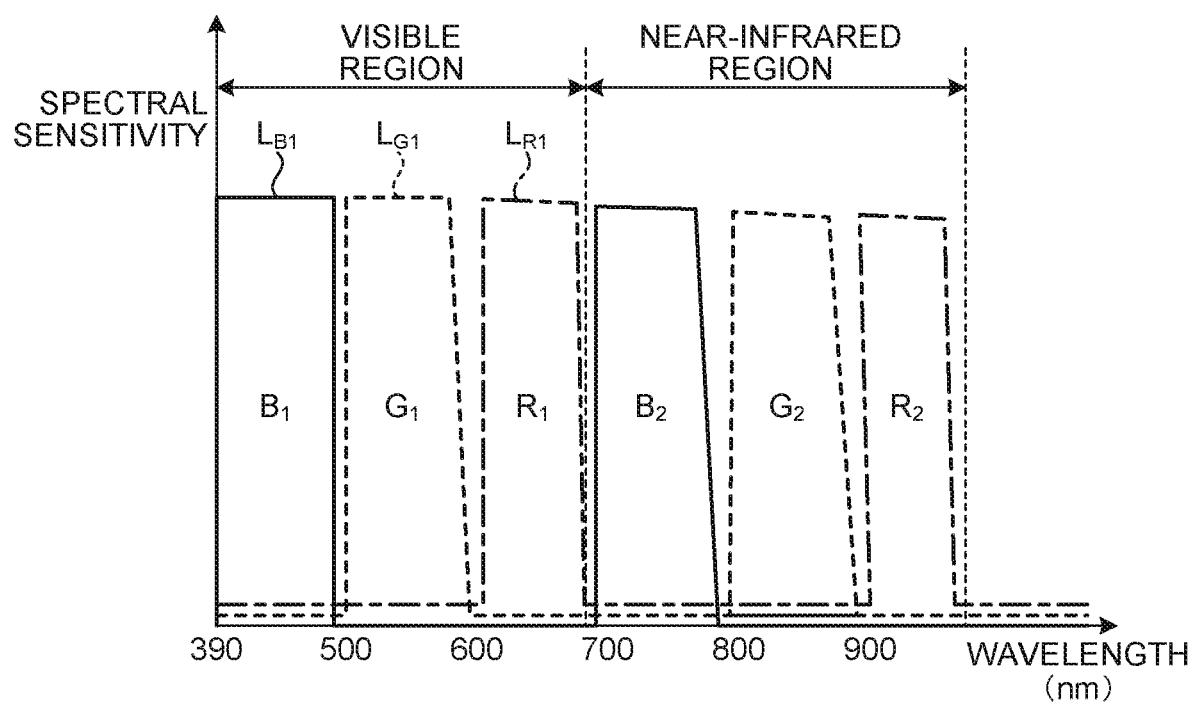
FIG. 4 is a diagram illustrating a spectral sensitivity characteristic of each of pixels included in the imaging apparatus according to the first embodiment.

A spectral sensitivity characteristic (transmission characteristic) of each of the pixels for which the above-described color filter 23 is arranged on the light receiving surface will be described below. FIG. 4 is a diagram illustrating the spectral sensitivity characteristic of each of the pixels. In FIG. 4, spectral sensitivity curves are standardized, as simulations, such that maximum values of spectral sensitivities of the respective pixels become equal to one another. Further, in FIG. 4, a curve $L_{B1}$ represents a spectral sensitivity curve of the third pixel $P_{B1}$, a curve $L_{G1}$ represents a spectral sensitivity curve of the second pixel $P_{G1}$, and a curve $L_{R1}$ represents a spectral sensitivity curve of the first pixel $P_{R1}$. Furthermore, in FIG. 4, the horizontal axis represents the wavelength (nm) and the vertical axis represents the spectral sensitivity (transmittance). Moreover, in the following description, it is assumed that the visible region corresponds to a range of 390 nm to 700 nm and the near-infrared region corresponds to a range of 700 nm to 1000 nm.

As illustrated in FIG. 4, the first pixel $P_{R1}$ has a sensitivity to visible light $R_1$ in the red wavelength band serving as the first visible region (the wavelength band of 600 nm to 700 nm) and near-infrared light $R_2$ in the first near-infrared region (a rising position on a short wavelength side is at 900 nm). Further, the second pixel $P_{G1}$ has a sensitivity to visible light $G_1$ in the green wavelength band serving as the second visible region (500 nm to 600 nm) and near-infrared light $G_2$ in the second near-infrared region (a rising position on a short wavelength side is at 800 nm). Furthermore, the third pixel $P_{B1}$ has a sensitivity to visible light $B_1$ in the blue wavelength band serving as the third visible region (390 nm to 500 nm) and near-infrared light $B_2$ in the third near-infrared region (a rising position on a short wavelength side is at 700 nm).

In this manner, the first pixel $P_{R1}$, the second pixel $P_{G1}$, and the third pixel $P_{B1}$ have sensitivities to the different visible regions and have sensitivities to the different near-infrared regions. Specifically, if the imaging element 22 captures an image when the first light source 3 irradiates the subject with visible light, the first pixel $P_{R1}$, the second pixel $P_{G1}$, and the third pixel $P_{B1}$ are represented by Equations (1) to (3) below as illustrated in FIG. 4 described above.

$$\text{First pixel } P_{R1} = R_1 \qquad (1)$$

$$\text{Second pixel } P_{G1} = G_1 \qquad (2)$$

$$\text{Third pixel } P_{B1} = B_1 \qquad (3)$$

Further, if the imaging element 22 captures an image when the first light source 3 irradiates the subject with visible light and the second light source 4 irradiates the subject with near-infrared light at the same time, the first pixel $P_{R1}$, the second pixel $P_{G1}$, and the third pixel $P_{B1}$ are represented by Equations (4) to (6) below as illustrated in FIG. 4 described above.

$$\text{First pixel } P_{R1} = R_1 + R_2 \qquad (4)$$

$$\text{Second pixel } P_{G1} = G_1 + G_2 \qquad (5)$$

$$\text{Third pixel } P_{B1} = B_1 + B_2 \qquad (6)$$

Meanwhile, in FIG. 4, the spectral sensitivity of each of the first pixel $P_{R1}$, the second pixel $P_{G1}$, and the third pixel $P_{B1}$ is represented by an ideal shape, but may include, for example, a part of the near-infrared light $R_2$, $G_2$, and $B_2$ in the near-infrared region. Further, the pixel values are represented by characters in Equations (1) to (6) described above for simplicity of explanation, but actual pixel values are values based on each of received light. For example, $R_1$ represents a pixel value (luminance value) based on received first visible light.

Processing Performed by Imaging Apparatus

Figure 5:
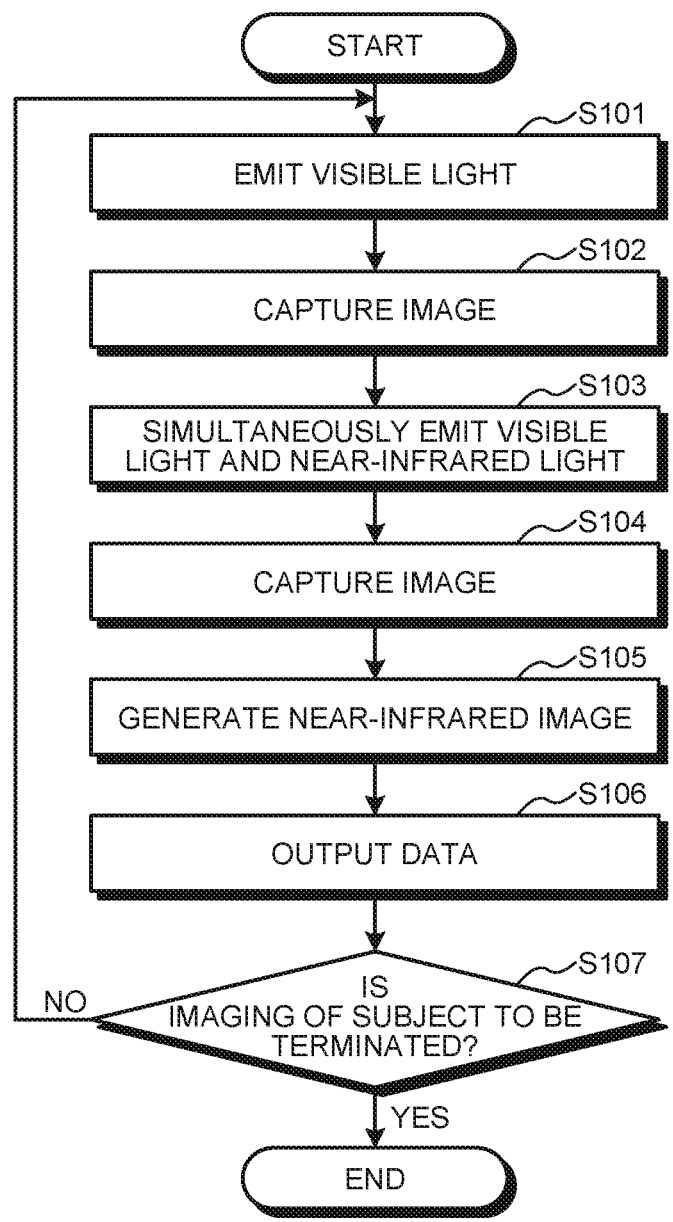
FIG. 5 is a flowchart illustrating an outline of processing performed by the imaging apparatus according to the first embodiment.

Processing performed by the imaging apparatus 1 will be described below. FIG. 5 is a flowchart illustrating an outline of the processing performed by the imaging apparatus 1.

As illustrated in FIG. 5, first, the light source control unit 61 causes the first light source 3 to irradiate the subject with visible light (Step S101).

Subsequently, the imaging control unit 62 causes the imaging element 22 to capture an image of the subject that is irradiated with the visible light by the first light source 3 (Step S102). In this case, the imaging element 22 outputs the first image data of the received visible light to the image processing unit 7 via the A/D conversion unit 24.

Thereafter, the light source control unit 61 causes the first light source 3 to irradiate the subject with the visible light and causes the second light source 4 to irradiate the subject with the near-infrared light simultaneously (Step S103).

Subsequently, the imaging control unit 62 causes the imaging element 22 to capture an image of the subject that is irradiated with the visible light and the near-infrared light by the first light source 3 and the second light source 4 (Step S104). In this case, the imaging element 22 outputs the second image data of the received visible light and the received near-infrared light to the image processing unit 7 via the A/D conversion unit 24.

Thereafter, the generation unit 71 generates different kinds of near-infrared image data based on the first image data and the second image data (Step S105). Specifically, the generation unit 71 generates a plurality of near-infrared images corresponding to the different kinds of near-infrared image data by subtracting the first image corresponding to the first image data from the second image corresponding to the second image data. More specifically, the generation unit 71 generates three kinds of near-infrared images by subtracting the pixel value of each of the pixels in the first image from the pixel value of each of the pixels in the second image at the same coordinates as in the first image. For example, the generation unit 71 eliminates a component (pixel value) in the visible region by subtracting a pixel value of the first pixel $P_{R1}$ in the first image from pixel value of the first pixel $P_{R1}$ in the second image by using Equation (4) and (1) as described above. In this case, the generation unit 71 generates the three kinds of near-infrared images by performing a demosaicing process of interpolating mosaic images of the three kinds of near-infrared images from pixel values of neighboring pixels of the same type. Here, the demosaicing process is any of a bilinear interpolation process, an interpolation process using a guide image, and an adaptive color plane interpolation (ACPI) process. While the generation unit 71 generates the three kinds of near-infrared images corresponding to the different kinds of near-infrared image data by subtracting the first image corresponding to the first image data from the second image corresponding to the second image data, embodiments are not limited thereto, and it may be possible to perform the subtraction after multiplying the pixel value of each of the pixels by a coefficient depending on the spectral sensitivity characteristic (shape) of each of the first pixel $P_{R1}$, the second pixel $P_{G1}$, and the third pixel $P_{B1}$. It is of course possible for the generation unit 71 to generate color image data that is the visible light image data by performing the demosaicing process on the first image data.

Subsequently, the display control unit 63 causes each of input channels of the external display device to output the three kinds of near-infrared image data generated by the generation unit 71 (not illustrated) (Step S106). Therefore, the display device is able to display the image data as false color images. As a result, it is possible to improve visibility of the near-infrared images.

Thereafter, if imaging of the subject is to be terminated (Step S107: Yes), the imaging apparatus 1 terminates the process. In contrast, if imaging of the subject is not to be terminated (Step S107: No), the imaging apparatus 1 returns to Step S101 described above.

According to the first embodiment as described above, the generation unit 71 generates the different kinds of near-infrared image data on the basis of the first image data and the second image data, so that it is possible to obtain the visible light image data (color image data) on the visible region and the three kinds of near-infrared image data on the different near-infrared regions.

Further, according to the first embodiment, the light source control unit 61 causes the second light source 4 to intermittently emit near-infrared light only when acquiring near-infrared image data, so that it is possible to prevent unnecessary irradiation.

Modification of First Embodiment

A modification of the first embodiment will be described below. The modification of the first embodiment has a different configuration from the imaging apparatus 1 according to the first embodiment as described above, and performs different processing. Specifically, in the modification of the first embodiment, each of the first light source and the second light source adjusts an amount of irradiation light depending on a saturated state of the pixel value of each of the pixels. In the following, a configuration of an imaging apparatus according to the modification of the first embodiment is first described, and thereafter, processing performed by the imaging apparatus according to the modification of the first embodiment is described. The same components as those of the imaging apparatus 1 according to the first embodiment as described above are denoted by the same reference symbols, and explanation thereof will be omitted.

Configuration of Imaging Apparatus

Figure 6:
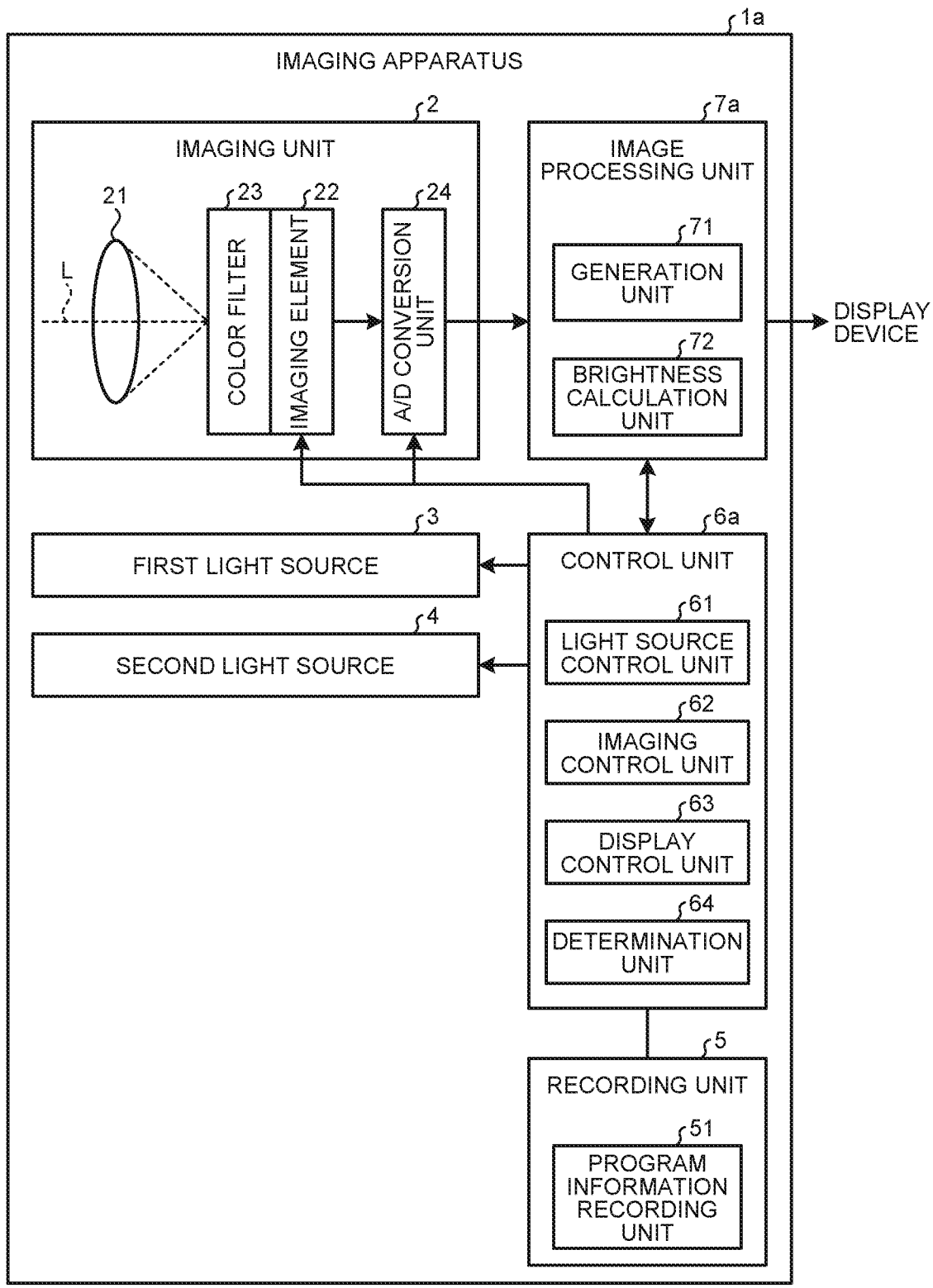
FIG. 6 is a block diagram illustrating a functional configuration of an imaging apparatus according to a modification of the first embodiment.

FIG. 6 is a block diagram illustrating a functional configuration of the imaging apparatus according to the modification of the first embodiment. An imaging apparatus 1a illustrated in FIG. 6 includes a control unit 6a and an image processing unit 7a instead of the control unit 6 and the image processing unit 7 of the imaging apparatus 1 according to the first embodiment as described above.

The control unit 6a further includes a determination unit 64 in addition to the components of the control unit 6 according to the first embodiment as described above. The determination unit 64 determines whether each of the pixels of the imaging element 22 is saturated on the basis of a calculation result obtained by a brightness calculation unit 72 of the image processing unit 7a to be described below.

The image processing unit 7a further includes the brightness calculation unit 72 in addition to the component of the image processing unit 7 according to the first embodiment as described above. The brightness calculation unit 72 calculates brightness caused by visible light emitted by the first light source 3 and near-infrared light emitted by the second light source 4 on the basis of the three kinds of near-infrared image data generated by the generation unit 71, and outputs a calculation result to the control unit 6a.

Processing Performed by Imaging Apparatus

Figure 7:
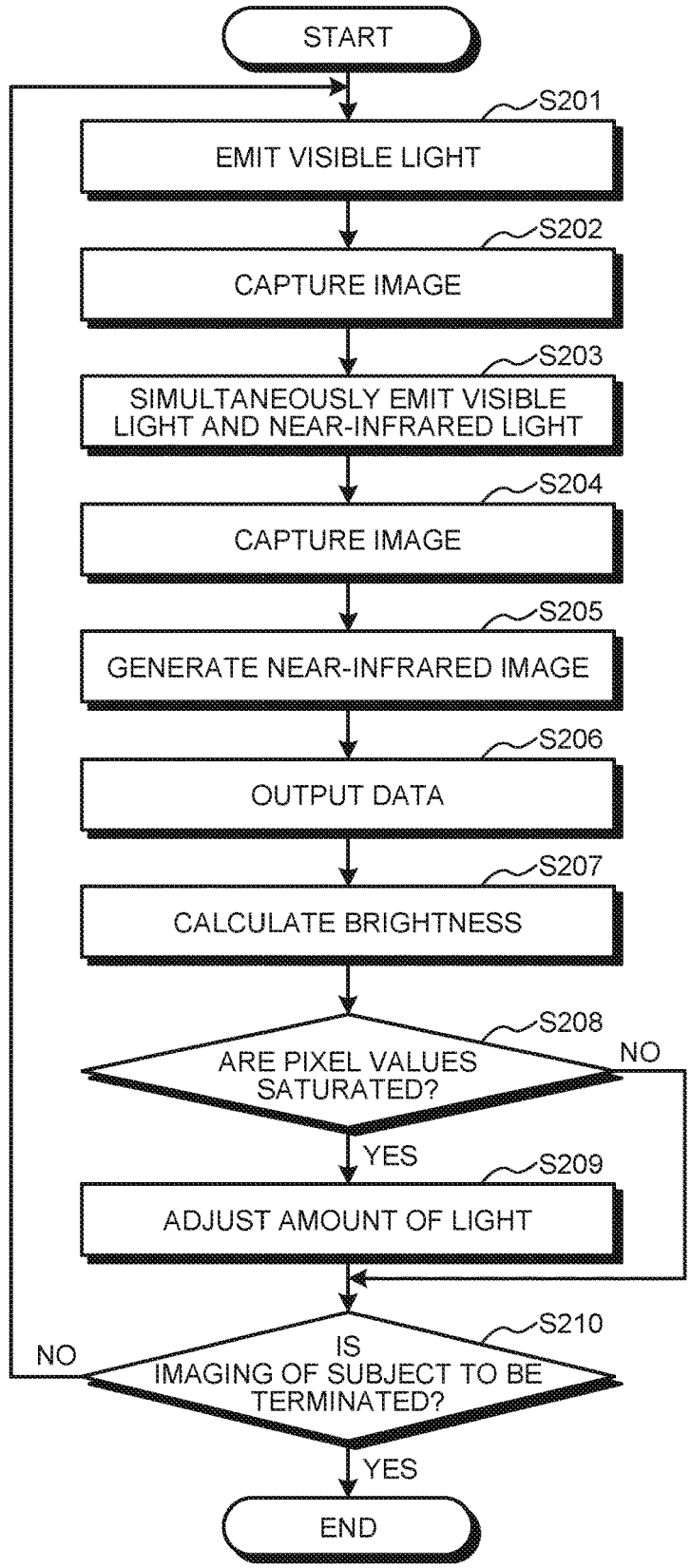
FIG. 7 is a flowchart illustrating an outline of processing performed by the imaging apparatus according to the modification of the first embodiment.

Processing performed by the imaging apparatus 1a will be described below. FIG. 7 is a flowchart illustrating an outline of the processing performed by the imaging apparatus 1a. In FIG. 7, Step S201 to Step S206 respectively correspond to Step S101 to Step S106 in FIG. 5 described above.

At Step S207, the brightness calculation unit 72 calculates brightness (for example, a luminance value) caused by visible light emitted by the first light source 3 and near-infrared light emitted by the second light source 4 on the basis of the three kinds of near-infrared image data generated by the generation unit 71.

Subsequently, the determination unit 64 determines whether the pixel value of each of the pixels of the imaging element 22 is saturated on the basis of the calculation result obtained by the brightness calculation unit 72 (Step S208). If the determination unit 64 determines that the pixel value of each of the pixels of the imaging element 22 is saturated (Step S208: Yes), the imaging apparatus 1a proceeds to Step S209 to be described below. In contrast, if the determination unit 64 determines that the pixel value of each of the pixels of the imaging element 22 is not saturated (Step S208: No), the imaging apparatus 1a proceeds to Step S210 to be described later.

At Step S209, the light source control unit 61 adjusts the amount of light emitted by each of the first light source 3 and the second light source 4. Specifically, the light source control unit 61 adjusts the amount of light emitted by each of the first light source 3 and the second light source 4 so as to realize an appropriate exposure amount. In this case, the light source control unit 61 may control adjustment such that the amount of near-infrared light emitted by the second light source 4 becomes smaller than the amount of visible light emitted by the first light source 3, or may control adjustment such that both of the amount of visible light emitted by the first light source 3 and the amount of near-infrared light emitted by the second light source 4 are reduced. After Step S209, the imaging apparatus 1a proceeds to Step S210 to be described below.

At Step S210, if imaging of the subject is to be terminated (Step S210: Yes), the imaging apparatus 1a terminates the process. In contrast, if imaging of the subject is not to be terminated (Step S210: No), the imaging apparatus 1a returns to Step S201 described above.

According to the modification of the first embodiment as described above, the light source control unit 61 adjusts the amount of light emitted by each of the first light source 3 and the second light source 4 so as to realize an appropriate exposure amount in accordance with the determination result obtained by the determination unit 64, so that it is possible to prevent saturation of the pixels.

While the light source control unit 61 controls the amount of light emitted by each of the first light source 3 and the second light source 4 in the modification of the first embodiment, it may be possible to prevent saturation of the pixels by causing the imaging control unit 62 to control an exposure time of the imaging element 22 for example. In this case, similarly to the light source control unit 61, it is sufficient for the imaging control unit 62 to control the exposure time of the imaging element 22 in accordance with the determination result obtained by the determination unit 64.

Furthermore, while the determination unit 64 determines whether the pixel value of each of the pixels of the imaging element 22 is saturated on the basis of the calculation result obtained by the brightness calculation unit 72 in the modification of the first embodiment, it may be possible to determine, for example, whether the number of pixels whose pixel values are saturated is equal to or larger than a threshold that is set in advance, in addition to determining whether the pixel value of each of the pixels is saturated.

Second Embodiment

A second embodiment will be described below. An imaging apparatus according to the second embodiment has a different configuration from that of the imaging apparatus 1 according to the first embodiment as described above. Specifically, in the imaging apparatus according to the second embodiment, a color filter has a different spectral sensitivity and a generation unit generates various kinds of near-infrared images by a different method. In the following, the configuration of the imaging apparatus according to the second embodiment is first described, and thereafter, the method of generating various kinds of near-infrared images by the generation unit will be described. The same components as those of the imaging apparatus 1 according to the first embodiment as described above are denoted by the same reference symbols, and explanation thereof will be omitted.

Configuration of Imaging Apparatus

Figure 8:
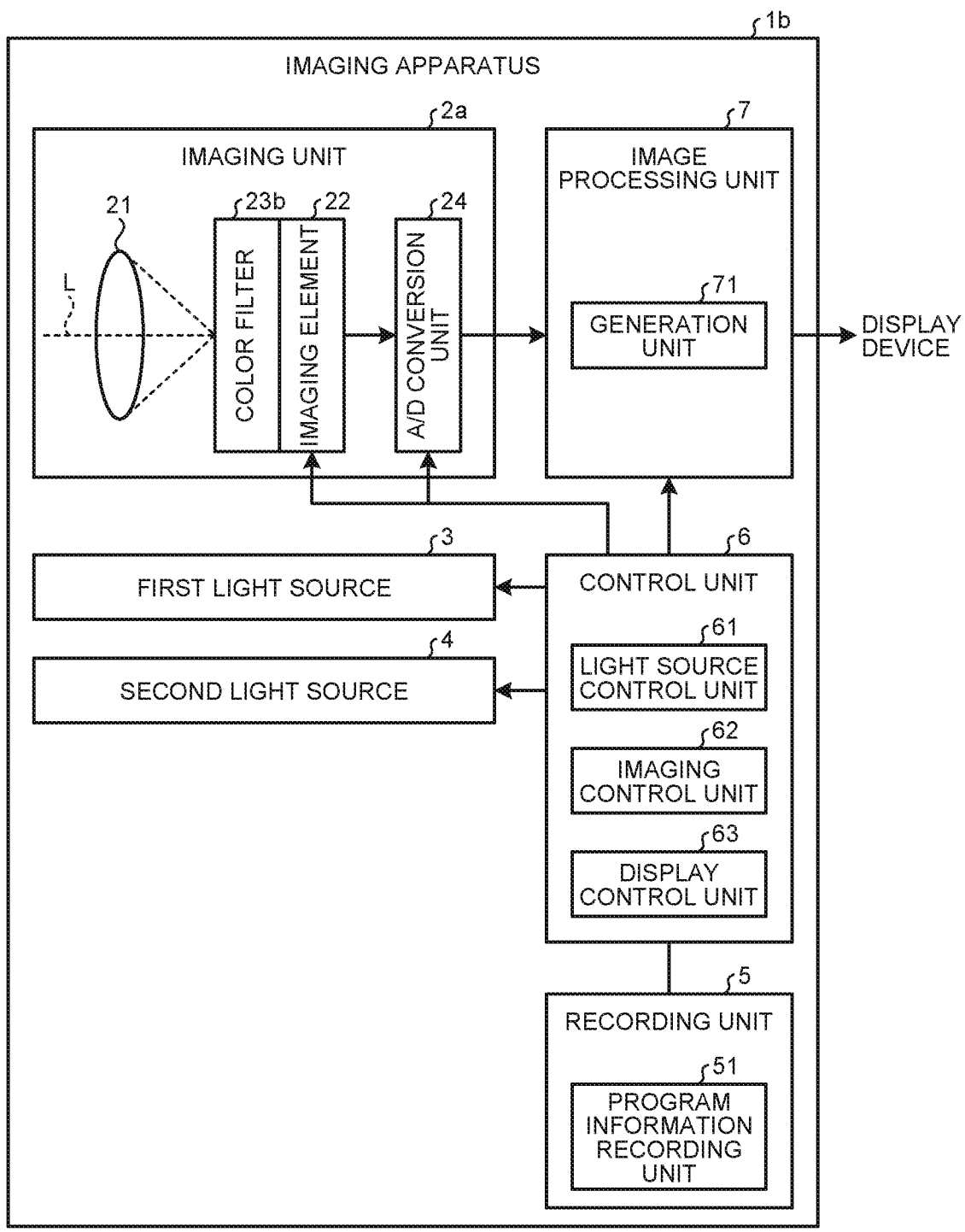
FIG. 8 is a block diagram illustrating a functional configuration of an imaging apparatus according to a second embodiment.

FIG. 8 is a block diagram illustrating a functional configuration of the imaging apparatus according to the second embodiment. An imaging apparatus 1b illustrated in FIG. 8 includes an imaging unit 2a instead of the imaging unit 2 of the imaging apparatus 1 according to the first embodiment as described above. The imaging unit 2a includes a color filter 23b instead of the color filter 23 of the imaging unit 2 according to the first embodiment as described above.

The color filter 23b is arranged on the light receiving surface of the imaging element 22, and includes a plurality of filters, each of which transmits light in an individually-set wavelength band. The plurality of filters are configured such that the filter unit U1 having Bayer arrangement, in which four filters of 2×2 are arranged in a two-dimensional grid pattern, is arranged in accordance with arrangement of the pixels $P_{ij}$. The pixels $P_{ij}$ for which the filters are arranged receive light that has certain wavelength bands and that has transmitted through the filters. Specifically, the pixel $P_{ij}$ for which the R filter that transmits visible light in the red wavelength band serving as the first visible region and near-infrared light in a first near-infrared region is arranged receives the visible light in the red wavelength band serving as the first visible region and the near-infrared light in the first near-infrared region. Hereinafter, the pixel $P_{ij}$ that receives the visible light in the red wavelength band serving as the first visible region and the near-infrared light in the first near-infrared region will be referred to as a first pixel $P_{R2}$. Similarly, the pixel $P_{ij}$ that receives visible light in the green wavelength band serving as the second visible region and near-infrared light in a second near-infrared region will be referred to as a second pixel $P_{G2}$, and the pixel $P_{ij}$ that receives visible light in the blue wavelength band serving as the third visible region and near-infrared light in a third near-infrared region will be referred to as a third pixel $P_{B2}$. Meanwhile, the color filter 23b has the same configuration as that of the first embodiment as described above except for the spectral sensitivity, and therefore, explanation of a detailed configuration thereof will be omitted.

Spectral Sensitivity Characteristic of Each of Pixels

Figure 9:
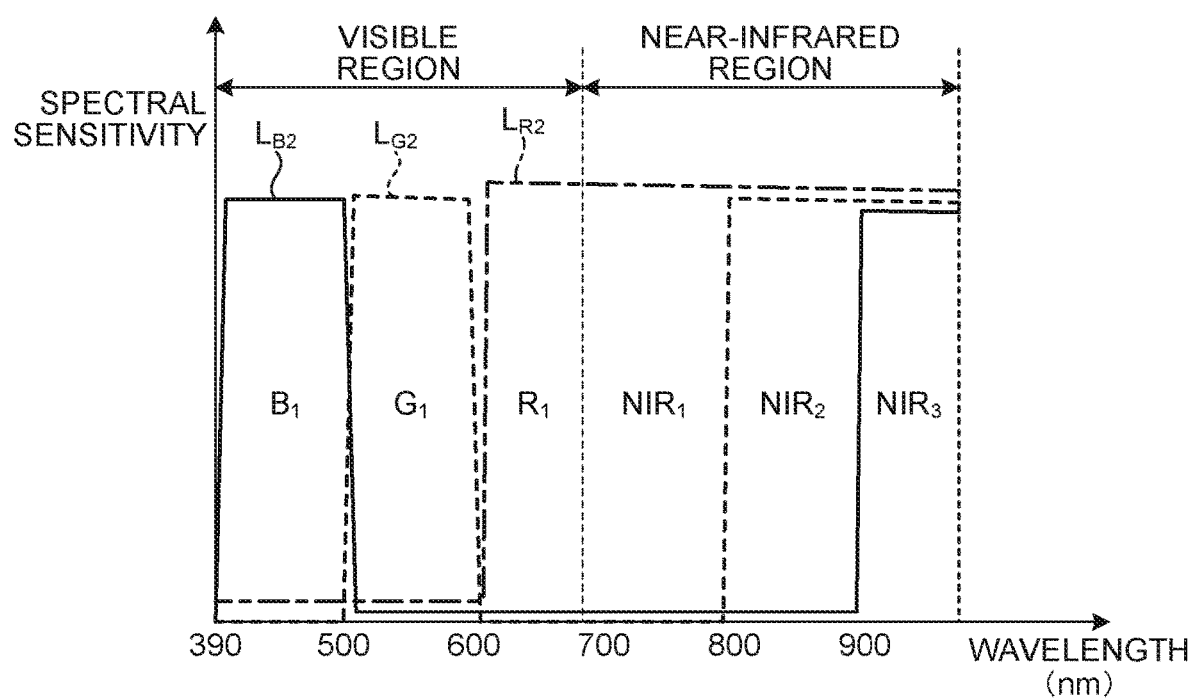
FIG. 9 is a diagram illustrating a spectral sensitivity characteristic of each of pixels included in the imaging apparatus according to the second embodiment.

A spectral sensitivity characteristic (transmission characteristic) of each of the pixels for which the above-described color filter 23b is arranged on the light receiving surface will be described below. FIG. 9 is a diagram illustrating the spectral sensitivity characteristic of each of the pixels. In FIG. 9, spectral sensitivity curves are standardized, as simulations, such that maximum values of the spectral sensitivities of the respective pixels become equal to one another. Further, in FIG. 9, a curve $L_{B2}$ represents a spectral sensitivity curve of the third pixel $P_{B2}$, a curve $L_{G2}$ represents a spectral sensitivity curve of the second pixel $P_{G2}$, and a curve $L_{R2}$ represents a spectral sensitivity curve of the first pixel $P_{R2}$. Furthermore, in FIG. 9, the horizontal axis represents the wavelength (nm) and the vertical axis represents the spectral sensitivity (transmittance).

As illustrated in FIG. 9, the third pixel $P_{B2}$ has a sensitivity to the visible light $B_1$ in the blue wavelength band serving as the third visible region (390 nm to 500 nm) and the near-infrared light $B_2$ in the third near-infrared region ($NIR_3$) (a rising position on a short wavelength side is at 900 nm). Further, the second pixel $P_{G2}$ has a sensitivity to the visible light $G_1$ in the green wavelength band serving as the second visible region (500 nm to 600 nm), near-infrared light in the third near-infrared region ($NIR_3$), and near-infrared light in the second near-infrared region ($NIR_2$) (a rising position on a short wavelength side is at 800 nm). Furthermore, the first pixel $P_{R2}$ has a sensitivity to the visible light $R_1$ in the red wavelength band serving as the first visible region (the wavelength band of 600 nm to 700 nm), near-infrared light in the first near-infrared region ($NIR_1$), near-infrared light in the second near-infrared region ($NIR_2$), and near-infrared light in the third near-infrared region ($NIR_3$).

The first pixel $P_{R2}$, the second pixel $P_{G2}$, and the third pixel $P_{B2}$, for which the color filter having the spectral sensitivity characteristics as described above is arranged, have sensitivities to the different visible-light wavelength bands and have sensitivities to the different near-infrared-light wavelength bands. Specifically, if the imaging element 22 captures an image when the first light source 3 irradiates the subject with visible light, the first pixel $P_{R2}$, the second pixel $P_{G2}$, and the third pixel $P_{B2}$ are represented by Equations (7) to (9) below as illustrated in FIG. 9 described above.

First pixel $P_{R2}=R_1$ (7)

Second pixel $P_{G2}=G_1$ (8)

Third pixel $P_{B2}=B_1$ (9)

Further, if the imaging element 22 captures an image when the first light source 3 irradiates the subject with visible light and the second light source 4 irradiates the subject with near-infrared light at the same time, the first pixel $P_{R2}$, the second pixel $P_{G2}$, and the third pixel $P_{B2}$ are represented by Equations (10) to (12) below as illustrated in FIG. 9 described above.

First pixel $P_{R1}=R_1+NIR_1+NIR_2+NIR_3$ (10)

Second pixel $P_{G1}=G_1+NIR_2+NIR_3$ (11)

Third pixel $P_{B1}=B_1+NIR_3$ (12)

Meanwhile, in FIG. 9, the spectral sensitivity of each of the first pixel $P_{B2}$, the second pixel $P_{G2}$, and the third pixel $P_{B2}$ is represented by an ideal shape, but may include, for example, a part of the near-infrared light $R_2$, $G_2$, and $B_2$ in the near-infrared region. Further, the pixel values are represented by characters in Equations (7) to (12) described above for simplicity of explanation, but actual pixel values are values based on each of received light. For example, $R_1$ represents a pixel value (luminance value) based on the received first visible light.

The method of generating the three kinds of near-infrared images by the generation unit 71 will be described below.

The generation unit 71 generates different kinds of near-infrared image data on the basis of the first image data that is generated by the imaging element 22 by capturing an image when the first light source 3 irradiates the subject with visible light, and on the basis of the second image data that is generated by the imaging element 22 by capturing an image when the first light source 3 irradiates the subject with visible light and the second light source 4 irradiates the subject with near-infrared light simultaneously. Specifically, the generation unit 71 generates a plurality of near-infrared images corresponding to the different kinds of near-infrared image data by subtracting the first image corresponding to the first image data from the second image corresponding to the second image data. More specifically, the generation unit 71 generates three kinds of near-infrared images by subtracting the pixel value of each of the pixels in the first image from the pixel value of each of the pixels in the second image at the same coordinates as in the first image. In this case, the generation unit 71 generates the three kinds of near-infrared images by performing a demosaicing process of interpolating mosaic images of the three kinds of near-infrared images from pixel values of neighboring pixels of the same type. Here, the demosaicing process is any of a bilinear interpolation process, an interpolation process using a guide image, and an ACPI process. While the generation unit 71 generates the three kinds of near-infrared images corresponding to the different kinds of near-infrared image data by subtracting the first image corresponding to the first image data from the second image corresponding to the second image data, embodiments are not limited thereto, and it may be possible to perform the subtraction after multiplying the pixel value of each of the pixels by a coefficient depending on the spectral sensitivity characteristic (shape)

of each of the first pixel $P_{R2}$, the second pixel $P_{G2}$, and the third pixel $P_{B2}$. It is of course possible for the generation unit 71 to generate color image data that is the visible light image data by performing the demosaicing process on the first image data.

According to the second embodiment as described above, it is possible to obtain three kinds of near-infrared image data on different near-infrared regions at highly-feasible spectral sensitivities.

Third Embodiment

A third embodiment will be described below. An imaging apparatus according to the third embodiment has a different configuration from that of the imaging apparatus 1 according to the first embodiment as described above. Specifically, in the imaging apparatus according to the third embodiment, a color filter has a different configuration. In the following, the configuration of the imaging apparatus according to the third embodiment will be described. The same components as those of the imaging apparatus 1 according to the first embodiment as described above are denoted by the same reference symbols, and explanation thereof will be omitted.

Configuration of Imaging Apparatus

Figure 10:
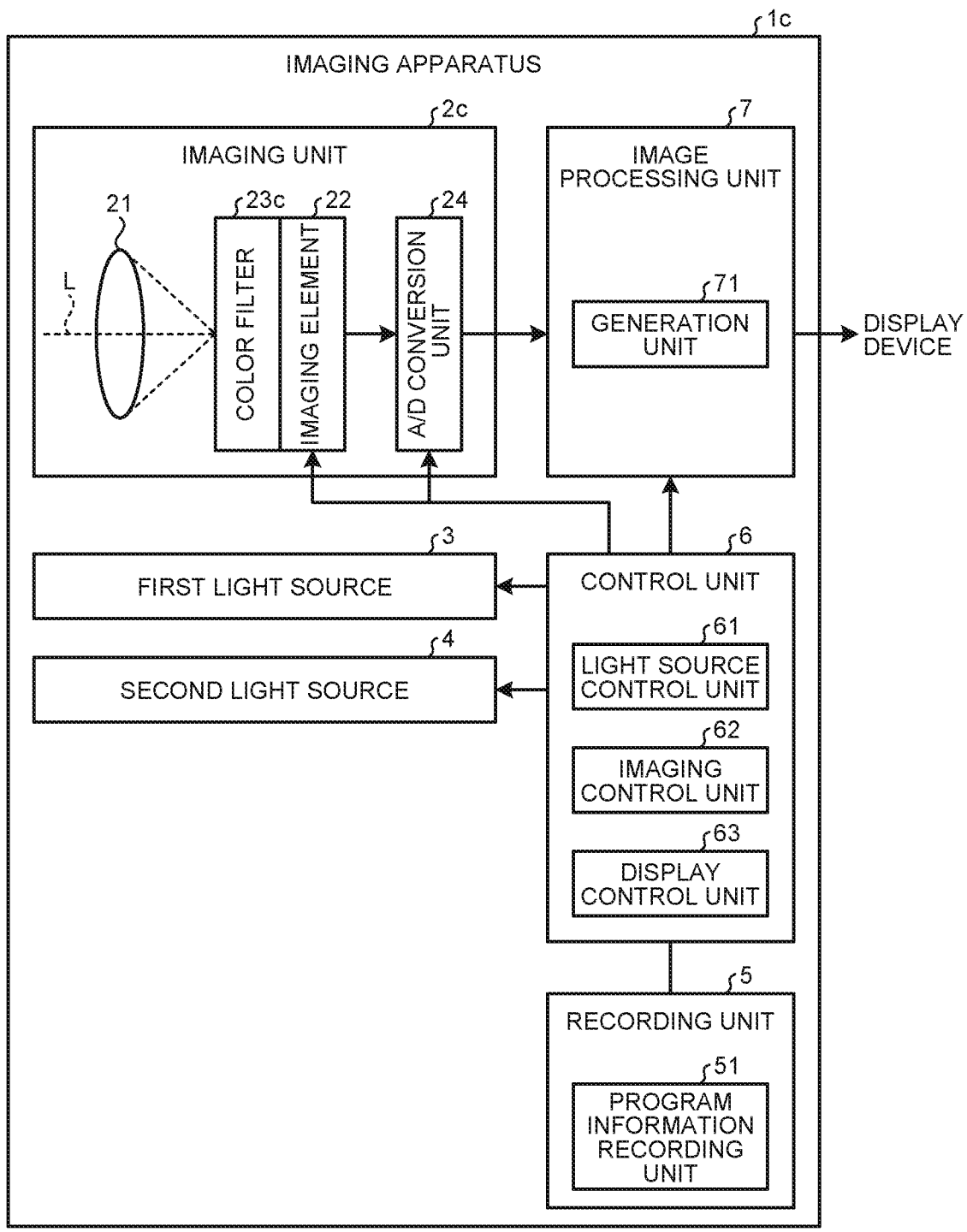
FIG. 10 is a block diagram illustrating a functional configuration of an imaging apparatus according to a third embodiment.

FIG. 10 is a block diagram illustrating a functional configuration of the imaging apparatus according to the third embodiment. An imaging apparatus 1c illustrated in FIG. 10 includes an imaging unit 2c instead of the imaging unit 2 of the imaging apparatus 1 according to the first embodiment as described above. The imaging unit 2c includes a color filter 23c instead of the color filter 23 of the imaging unit 2 according to the first embodiment as described above.

Figure 11:
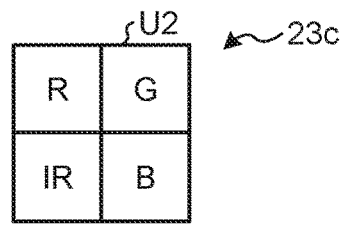
FIG. 11 is a diagram schematically illustrating a configuration of a color filter included in the imaging apparatus according to the third embodiment.

FIG. 11 is a diagram schematically illustrating a configuration of the color filter 23c. As illustrated in FIG. 11, the color filter 23c is arranged on the light receiving surface of the imaging element 22, and includes a plurality of filters, each of which transmits light in an individually-set wavelength band. The plurality of filters are configured such that the filter unit U2 having Bayer arrangement, in which four filters of 2×2 are arranged in a two-dimensional grid pattern, is arranged in accordance with arrangement of the pixels $P_{ij}$. The pixels $P_{ij}$ for which the filters are arranged receive light in certain wavelength bands transmitted through the filters. Specifically, the color filter 23c includes an IR filter (fourth filter) that transmits near-infrared light in the near-infrared region, in addition to the R filter, the G filter, and the B filter of the first embodiment as described above. The pixel $P_{ij}$ for which the IR filter that transmits near-infrared light in the near-infrared region is arranged receives the near-infrared light in the near-infrared region. Hereinafter, the pixel $P_{ij}$ that receives the near-infrared light in the near-infrared region will be referred to as a fourth pixel $P_{IR}$.

Spectral Sensitivity Characteristic of Each of Pixels

Figure 12:
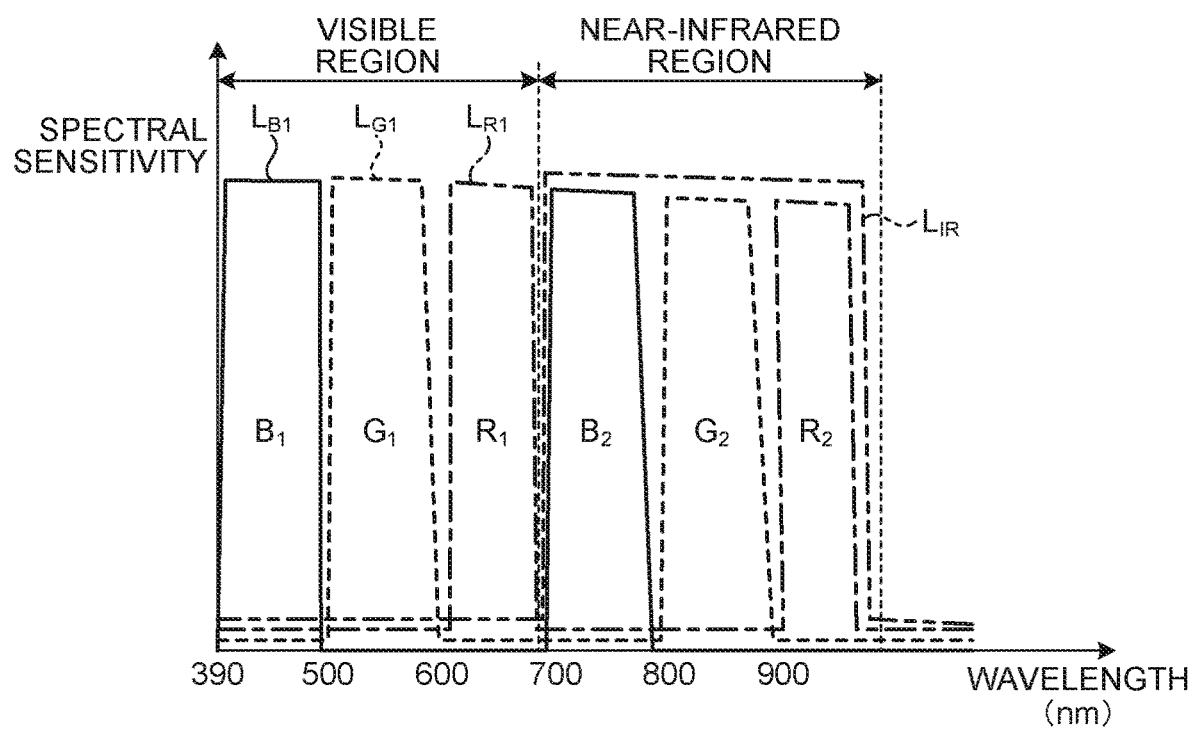
FIG. 12 is a diagram illustrating a spectral sensitivity characteristic of each of pixels included in the imaging apparatus according to the third embodiment.

A spectral sensitivity characteristic (transmission characteristic) of each of the pixels for which the above-described color filter 23c is arranged on the light receiving surface will be described below. FIG. 12 is a diagram illustrating the spectral sensitivity characteristic of each of the pixels. In FIG. 12, spectral sensitivity curves are standardized, as simulations, such that maximum values of the spectral sensitivities of the respective pixels become equal to one another. Further, in FIG. 12, the curve $L_{B1}$ represents the spectral sensitivity curve of the third pixel $P_{B1}$ the curve $L_{G1}$ represents the spectral sensitivity curve of the second pixel $P_{G1}$ the curve $L_{R1}$ represents the spectral sensitivity curve of the first pixel $P_{R1}$, and a curve $L_{IR}$ represents a spectral sensitivity curve of the fourth pixel $P_{IR}$. Furthermore, in FIG. 12, the horizontal axis represents the wavelength (nm) and the vertical axis represents the spectral sensitivity (transmittance).

As illustrated in FIG. 12, the fourth pixel $P_{IR}$ has a sensitivity to the entire near-infrared region (the wavelength band of 700 nm to 900 nm). That is, the IR filter transmits near-infrared light in each of the R filter, the G filter, and the B filter.

In this manner, the first pixel $P_{R1}$, the second pixel $P_{G1}$, and the third pixel $P_{G1}$ have sensitivities to the different visible-light wavelength bands and have sensitivities to the different near-infrared-light wavelength bands. Further, the fourth pixel $P_{IR}$ has a sensitivity to the entire near-infrared region. Therefore, in the imaging apparatus 1c, when the light source control unit 61 causes the first light source 3 and the second light source 4 to simultaneously irradiate the subject with light only once, the imaging control unit 62 causes the imaging element 22 to capture an image and generate image data. In this case, the generation unit 71 is able to generate the visible light image data and a single kind of near-infrared image data by performing the demosaicing process on the image data generated by the imaging element 22. In this case, the generation unit 71 generates the near-infrared image data by performing the demosaicing process on the pixel value of the fourth pixel $P_{IR}$ by using the pixel value of the neighboring fourth pixel $P_{IR}$.

According to the third embodiment as described above, it is possible to simultaneously obtain the visible light image data and a single kind of near-infrared image data by simultaneously irradiating the subject with visible light and near-infrared light only once.

While a single kind of near-infrared image data is obtained in the third embodiment, embodiments are not limited thereto, and it may be possible to obtain three kinds of near-infrared image data on different near-infrared regions (image data on the fourth near-infrared region), similarly to the first and the second embodiments as described above. In this case, if the generation unit 71 generates three different kinds of near-infrared image data different from the fourth pixel $P_{IR}$ by performing the demosaicing process on the basis of the first image data that is generated by the imaging element 22 by capturing an image when the first light source 3 irradiates the subject with visible light, and on the basis of the second image data that is obtained by the imaging element by capturing an image when the first light source 3 irradiates the subject with visible light and the second light source 4 irradiates the subject with near-infrared light simultaneously, it may be possible to perform the demosaicing process by using the fourth pixel $P_{IR}$ as a guide because the fourth pixel $P_{IR}$ is correlated with the spectral distribution in each of the near-infrared regions of the three kinds of pixels. Consequently, it is possible to obtain the three kinds of near-infrared image data with high accuracy.

Other Embodiments

Various disclosures may be made by appropriately combining a plurality of components disclosed in the first to the third embodiments described above. For example, some of the components may be removed from all of the components illustrated in the first to the third embodiments as described above. Furthermore, the components illustrated in the first to the third embodiments as described above may be appropriately combined.

Moreover, while the imaging apparatus and the display device are separated from each other in the first to the third embodiments, they may be integrated with each other.

Furthermore, in the present embodiments, "a unit" described above may be replaced with "a means", "a circuit", or the like. For example, the control unit may be replaced with a control means or a control circuit.

Moreover, in the present embodiments, data or the like is transmitted from the imaging apparatus to the display device via a transmission cable, but the transmission need not always be performed in a wired manner and may be performed in a wireless manner. In this case, it is sufficient to transmit image data or the like from the imaging apparatus to the display device in accordance with a predetermined wireless communication standard (for example, Wi-Fi (registered trademark) or Bluetooth (registered trademark)). It is of course possible to perform wireless communication based on other wireless communication standards.

Furthermore, while the imaging apparatus is used in the present embodiments, it may be possible to adopt a flexible or rigid endoscope to be inserted in a subject, a capsule endoscope, a video microscope that captures images of a subject, a mobile phone having an imaging function, and a tablet terminal having an imaging function.

In describing the flowcharts in this specification, context of the processes is described by using expressions such as "first", "thereafter", "subsequently", and the like, but the sequences of the processes necessary for carrying out the present disclosure are not uniquely defined by these expressions. In other words, the sequences of the processes in the flowcharts described in the present specification may be modified as long as there is no contradiction.

According to the present disclosure, it is possible to acquire a visible light image and a plurality of near-infrared images in different near-infrared regions.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
    an imaging sensor including a plurality of pixels that are arranged in a two-dimensional grid pattern, the pixels being configured to generate image data by receiving light and performing photoelectric conversion;
    a color filter including a plurality of filters configured to transmit visible light in different wavelength bands in a visible region and near-infrared light in different wavelength bands in a near-infrared region, the plurality of filters being arranged to correspond to the pixels;
    a first light source configured to irradiate a subject with the visible light;
    a second light source configured to irradiate the subject with the near-infrared light;
    a first processor comprising hardware, the first processor being configured to control an irradiation timing of each of the first light source and the second light source; and
    a second processor comprising hardware, the second processor being configured to generate a plurality of pieces of near-infrared image data on different near-infrared regions based on first image data and second image data, the first image data being generated by the imaging sensor by capturing an image of the subject when the first processor causes the first light source to emit the visible light, the second image data being generated by the imaging sensor by capturing an image of the subject when the first processor causes the first light source to emit the visible light and causes the second light source to emit the near-infrared light simultaneously;
    wherein the second processor is configured to generate the plurality of pieces of near-infrared image data by subtracting a pixel value of each of pixels of a first image corresponding to the first image data from a pixel value of each of pixels of a second image corresponding to the second image data, and thereafter interpolating pixel values from pixel values of neighboring pixels of a same type.

2. The imaging apparatus according to claim 1, wherein the first processor causes the second light source to intermittently emit the near-infrared light.

3. The imaging apparatus according to claim 1, wherein the second processor is further configured to calculate brightness of the visible light and the near-infrared light based on the second image data, and
    the first processor is further configured to
        determine whether a pixel value of each of pixels of the second image corresponding to the second image data is saturated based on a calculation result obtained by the second processor, and
        if it is determined that the pixel value of each of the pixels is saturated, reduce an amount of light including the visible light emitted by the first light source and the near-infrared light emitted by the second light source.

4. The imaging apparatus according to claim 1, wherein the second processor is further configured to calculate brightness of the visible light and the near-infrared light based on the second image data, and
    the first processor is further configured to
        determine whether a pixel value of each of pixels of the second image corresponding to the second image data is saturated based on a calculation result obtained by the second processor, and
        if it is determined that the pixel value of each of the pixels is saturated, reduce an exposure time of the imaging sensor.

5. The imaging apparatus according to claim 1, wherein the first processor is further configured to assign each piece of the near-infrared image data to an input channel of a display, and output and display each piece of the near-infrared image data.

6. The imaging apparatus according to claim 1, wherein the color filter includes:
    a first filter configured to transmit visible light in a first visible region and near-infrared light in a first near-infrared region;
    a second filter configured to transmit visible light in a second visible region and near-infrared light in a second near-infrared region; and
    a third filter configured to transmit visible light in a third visible region and near-infrared light in a third near-infrared region.

7. The imaging apparatus according to claim 1, wherein the color filter includes:
    a first filter configured to transmit visible light in a first visible region and near-infrared light in a first near-infrared region;

a second filter configured to transmit visible light in a second visible region, near-infrared light in the first near-infrared region, and near-infrared light in a second near-infrared region; and a third filter configured to transmit visible light in a third visible region, near-infrared light in the first near-infrared region, near-infrared light in the second near-infrared region, and near-infrared light in a third near-infrared region.

8. The imaging apparatus according to claim 6, wherein a rising position on a short wavelength side of the first near-infrared region, a rising position on a short wavelength side of the second near-infrared region, and a rising position on a short wavelength side of the third near-infrared region are different from one another.

9. The imaging apparatus according to claim 1, wherein the color filter includes:
a first filter configured to transmit visible light in a first visible region and near-infrared light in a first near-infrared region;
a second filter configured to transmit visible light in a second visible region and near-infrared light in a second near-infrared region;
a third filter configured to transmit visible light in a third visible region and near-infrared light in a third near-infrared region; and
a fourth filter configured to transmit near-infrared light in a fourth near-infrared region including the first near-infrared region, the second near-infrared region, and the third near-infrared region.

10. The imaging apparatus according to claim 9, wherein the second processor is configured to generate three kinds of near-infrared image data on different near-infrared regions by performing a demosaicing process by using, as a guide, a pixel value of a pixel provided with a light receiving surface on which the fourth filter is arranged.

11. An imaging method implemented by an imaging apparatus including:
an imaging sensor including a plurality of pixels that are arranged in a two-dimensional grid pattern, the pixels being configured to generate image data by receiving light and performing photoelectric conversion;
a color filter including a plurality of filters configured to transmit visible light in different wavelength bands in a visible region and near-infrared light in different wavelength bands in a near-infrared region, the plurality of filters being arranged to correspond to the pixels;
a first light source configured to irradiate a subject with the visible light; and
a second light source configured to irradiate the subject with the near-infrared light,
the imaging method comprising:
causing the first light source to emit the visible light;
causing the imaging sensor to capture an image of the subject irradiated with the visible light and generate first image data;
causing the first light source and the second light source to emit light simultaneously;
causing the imaging sensor to capture an image of the subject irradiated with the visible light and the near-infrared light and generate second image data; and
generating a plurality of pieces of near-infrared image data on different near-infrared regions based on the first image data and the second image data;
wherein the generating of the plurality of pieces of near-infrared image data comprises subtracting a pixel value of each of pixels of a first image corresponding to the first image data from a pixel value of each of pixels of a second image corresponding to the second image data, and thereafter interpolating pixel values from pixel values of neighboring pixels of a same type.

12. A non-transitory computer-readable recording medium with an executable program stored thereon, the program causing an imaging apparatus that includes:
an imaging sensor including a plurality of pixels that are arranged in a two-dimensional grid pattern, the pixels being configured to generate image data by receiving light and performing photoelectric conversion;
a color filter including a plurality of filters configured to transmit visible light in different wavelength bands in a visible region and near-infrared light in different wavelength bands in a near-infrared region, the plurality of filters being arranged to correspond to the pixels;
a first light source configured to irradiate a subject with the visible light; and
a second light source configured to irradiate the subject with the near-infrared light, to execute:
causing the first light source to emit the visible light;
causing the imaging sensor to capture an image of the subject irradiated with the visible light and generate first image data;
causing the first light source and the second light source to emit light simultaneously;
causing the imaging sensor to capture an image of the subject irradiated with the visible light and the near-infrared light and generate second image data; and
generating a plurality of pieces of near-infrared image data on different near-infrared regions based on the first image data and the second image data;
wherein the generating of the plurality of pieces of near-infrared image data comprises subtracting a pixel value of each of pixels of a first image corresponding to the first image data from a pixel value of each of pixels of a second image corresponding to the second image data, and thereafter interpolating pixel values from pixel values of neighboring pixels of a same type.

* * * * *